United States Patent
Siliqi et al.

(10) Patent No.: US 9,791,581 B2
(45) Date of Patent: Oct. 17, 2017

(54) METHOD AND SYSTEM FOR SIMULTANEOUS ACQUISITION OF PRESSURE AND PRESSURE DERIVATIVE DATA WITH GHOST DIVERSITY

(71) Applicant: CGG SERVICES SA, Massy (FR)

(72) Inventors: Risto Siliqi, Paris (FR); Karine Desrues, Massy (FR)

(73) Assignee: CGG SERVICES SAS, Massy (FR)

( * ) Notice: Subject to any disclaimer, the term of this patent is extended or adjusted under 35 U.S.C. 154(b) by 51 days.

(21) Appl. No.: 14/891,765

(22) PCT Filed: Jun. 6, 2014

(86) PCT No.: PCT/EP2014/061849
§ 371 (c)(1),
(2) Date: Nov. 17, 2015

(87) PCT Pub. No.: WO2014/195467
PCT Pub. Date: Dec. 11, 2014

(65) Prior Publication Data
US 2016/0131784 A1   May 12, 2016

Related U.S. Application Data
(60) Provisional application No. 61/832,428, filed on Jun. 7, 2013.

(51) Int. Cl.
 *G01V 1/38*  (2006.01)
 *G01V 1/20*  (2006.01)
 *G01V 1/36*  (2006.01)

(52) U.S. Cl.
CPC ............. *G01V 1/364* (2013.01); *G01V 1/201* (2013.01); *G01V 1/362* (2013.01); *G01V 1/3808* (2013.01); *G01V 2210/56* (2013.01)

(58) Field of Classification Search
CPC ...... G01V 1/362; G01V 1/3808; G01V 1/364; G01V 1/201; G01V 2210/56
(Continued)

(56) References Cited

U.S. PATENT DOCUMENTS 8,174,926 B2 * 5/2012 Kluver .................... G01V 1/36
                                                      367/21
8,456,951 B2   6/2013 Soubaras
(Continued)

FOREIGN PATENT DOCUMENTS

FR   2966253 A1   4/2012
GB   2493088 A    1/2013

OTHER PUBLICATIONS

International Search Report in related International Application No. PCT/EP2014/061849, mailed Feb. 5, 2015.
(Continued)

*Primary Examiner* — Daniel L Murphy
(74) *Attorney, Agent, or Firm* — Patent Portfolio Builders PLLC

(57) ABSTRACT

A marine streamer spread for acquiring seismic data, the spread including a streamer having a first portion and a second portion; the first portion including both first pressure sensors and pressure derivative sensors for acquiring the seismic data; and the second portion including second pressure sensors. The first portion imparts ghost diversity to the seismic data by having a variable-depth profile and the pressure derivative sensors impart polarity diversity to the seismic data.

17 Claims, 11 Drawing Sheets

(58) Field of Classification Search
USPC .......................................................... 367/24
See application file for complete search history.

(56) References Cited

U.S. PATENT DOCUMENTS

| | | |
|---|---|---|
| 9,103,941 B2 | 8/2015 | Poole |
| 9,581,714 B2* | 2/2017 | Barral .................. G01V 1/3817 |
| 2008/0259726 A1 | 10/2008 | van Manen et al. |
| 2011/0305109 A1* | 12/2011 | Soubaras ................. G01V 1/28 |
| | | 367/24 |
| 2013/0163376 A1 | 6/2013 | Poole |

OTHER PUBLICATIONS

C. Riyanti et al., "Pressure Wave-Field Deghosting or Non-Horizontal Streamers", SEG, Technical Program Expanded Abstract, Nov. 14, 2008, pp. 2652-2656.

R. Soubaras et al., "Variable-Depth Streamer Acquisition: Broadband Data for Imaging and Inversion", Geophysics, Mar.-Apr. 2013; vol. 78, No. 2, pp. WA27-WA39.

* cited by examiner

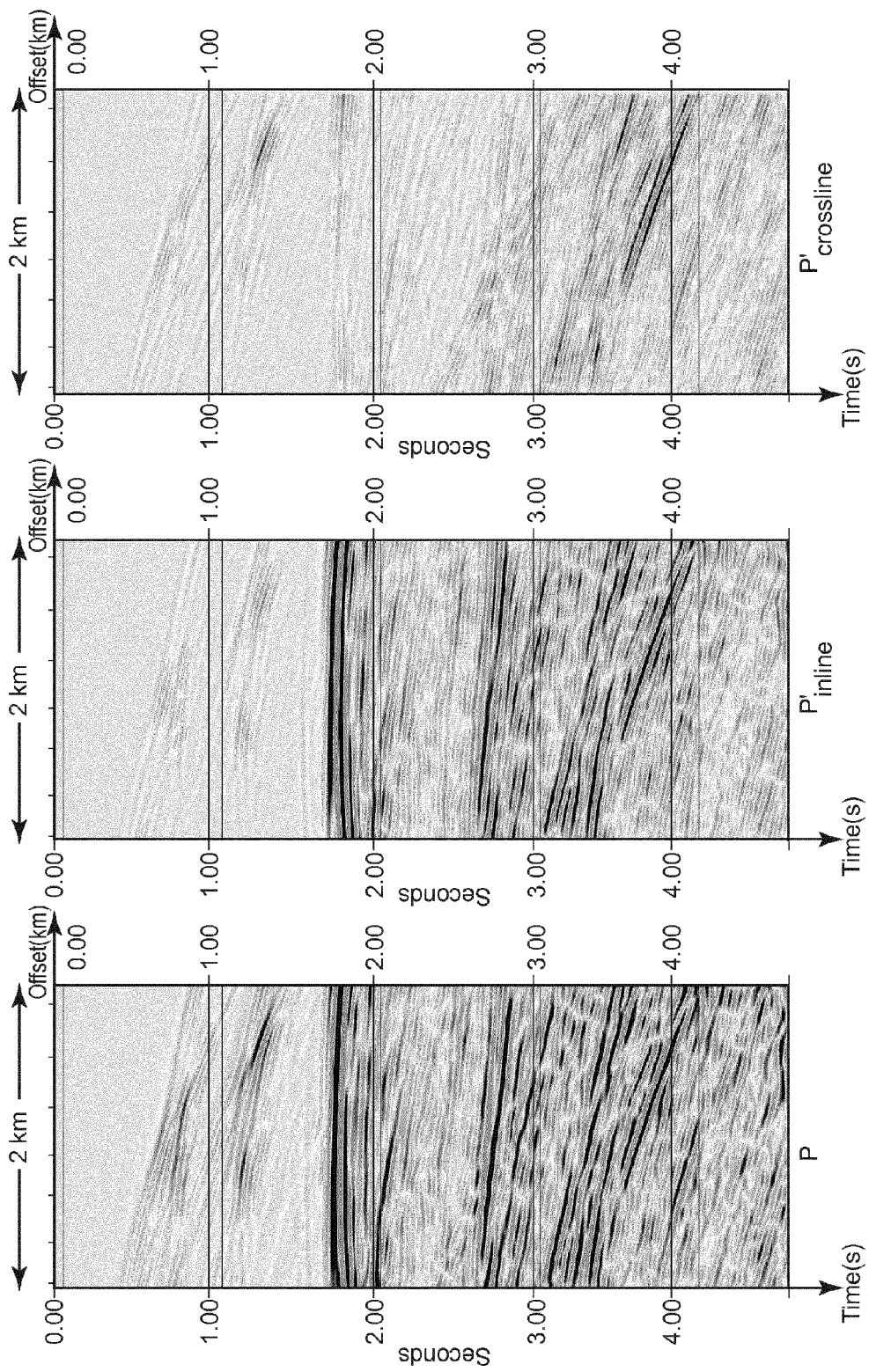

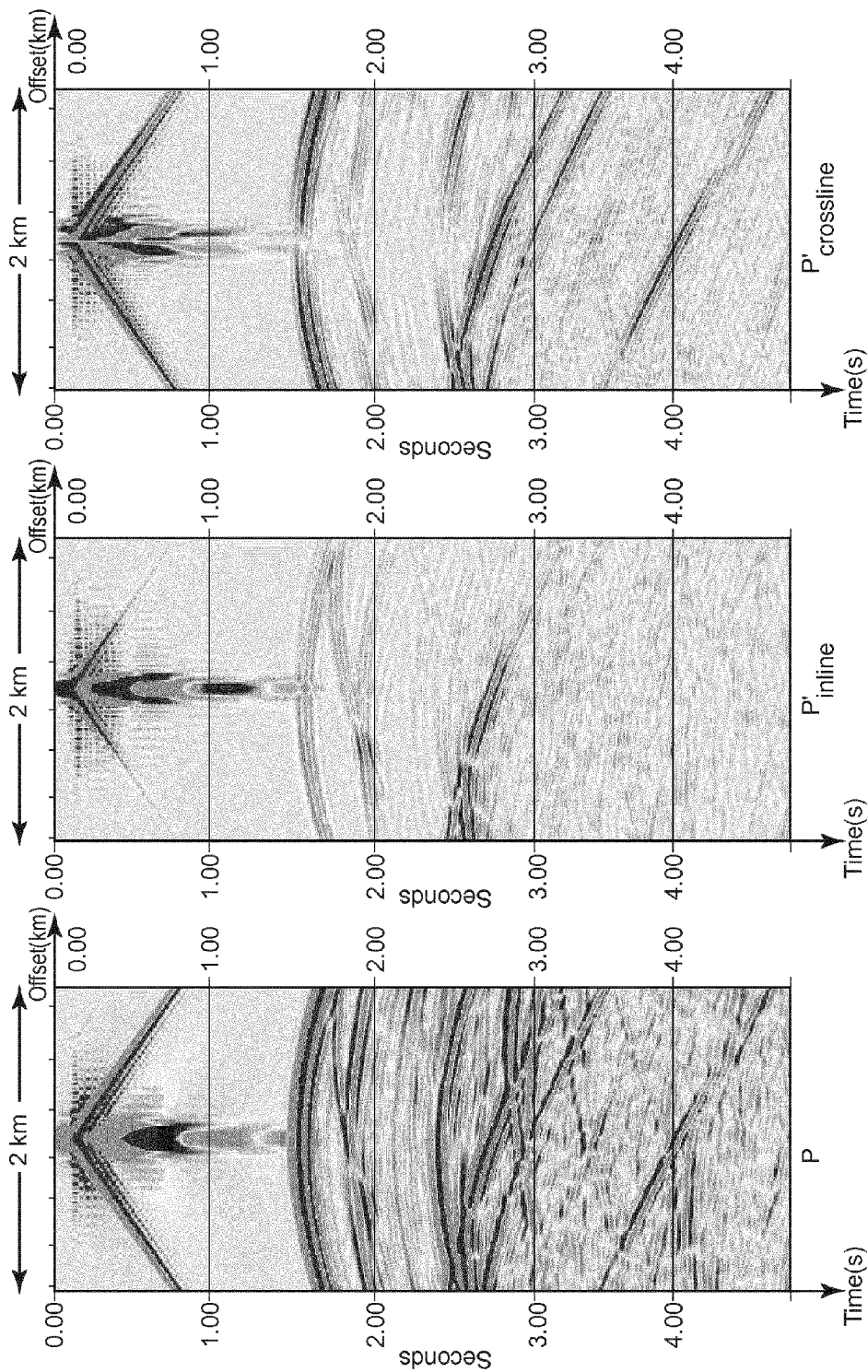

METHOD AND SYSTEM FOR SIMULTANEOUS ACQUISITION OF PRESSURE AND PRESSURE DERIVATIVE DATA WITH GHOST DIVERSITY

BACKGROUND

Technical Field

Embodiments of the subject matter disclosed herein generally relate to methods and systems and, more particularly, to mechanisms and techniques for acquiring seismic data having ghost and polarity diversity which is suitable for deghosting high- and medium-frequency data.

Discussion of the Background

Seismic reflection is a method of geophysical exploration to determine the properties of a portion of the earth's subsurface, information that is especially helpful in the oil and gas industry. Marine seismic reflection is based on the use of a controlled source that sends energy waves into the earth. By measuring the time it takes for the reflections to come back to plural receivers, it is possible to estimate the depth and/or composition of the features causing such reflections. These features may be associated with subterranean hydrocarbon deposits.

For marine applications, a seismic survey system 100, as illustrated in FIG. 1, includes a vessel 102 that tows plural streamers 110 (only one is visible in the figure) and a seismic source 130. Streamer 110 is attached through a lead-in cable (or other cables) 112 to vessel 102, while source array 130 is attached through an umbilical 132 to the vessel. A head float 114, which floats at the water surface 104, is connected through a cable 116 to a streamer head junction 110A to streamer 110, while a tail buoy 118 is connected, through a similar cable 116, to a tail end 110B of streamer 110. Head float 114 and tail buoy 118 are used, among other things, to maintain the streamer's depth and to provide surface reference for positioning the underwater equipment. Seismic receivers 122 are distributed along the streamer and are configured to record seismic data. Seismic receivers 122 may include a hydrophone, geophone, accelerometer, gradient pressure receiver or a combination thereof. Positioning devices (birds and acoustics) 128 are attached along the streamer and interact with their respective controllers 126 and ranging devices 129 for adjusting a position of the streamer according to a survey plan.

Source array 130 has plural source elements 136, which are typically air guns. Alternatively, the source elements may be vibrators. The source elements are attached to a float 137 to travel at desired depths below the water surface 104. During operation, vessel 102 follows a predetermined path (or navigation track) T while source elements 136 emit acoustic waves 140. These waves bounce off the ocean bottom 142 and other layer interfaces below the ocean bottom 142 and propagate as reflected/refracted waves 144 that are recorded by receivers 122. The positions of both the source element 136 and recording receiver 122 are estimated based on GPS systems 124, acoustic devices 129 and depth controllers (birds) 126 and are recorded together with the seismic data in a storage device 127 onboard the vessel. Controller 126 is typically connected to the vessel's navigation system and other elements of the seismic survey system, e.g., birds 128.

Receiver 122 traditionally records sound pressure generated by wave 144 (primary). However, down-going waves 150 (ghosts) are also recorded by receiver 122, which interferes with up-going wave and mask the true signal 144. Ghost 150 originates from seismic source 130, but suffers a negative water reflection at water surface 104 (which results in a phase shift that modifies its polarity), which flips the polarity of seismic wave besides the subsurface reflection on layer 142 or other subsurface layer. Thus, ghost 150 propagates from the water surface toward receiver 122, while primary 144 propagates from the subsurface toward receiver 122. In this way, ghost 150 is recorded together with the primary by the same receiver, producing notches in the seismic data, which is undesirable.

To unmask the true signal 144 (i.e., deghost the data), various methods have been proposed in the art. One such deghosting process has been disclosed, for example, in U.S. Pat. No. 8,456,951 (herein '951) authored by R Soubaras, the entire content of which is incorporated herein. According to the '951 patent, a method for deghosting uses joint deconvolution for migration and mirror migration images to generate a final image of a subsurface. Deghosting is performed at the end of processing (during an imaging phase) and not at the beginning, as with traditional methods. Further, the '951 patent discloses that no datuming step (i.e., reconstructing the data at another depth) is performed on the data. Other deghosting methods have been proposed in the art.

However, there is a need for a new deghosting method that further removes the ghost from recorded seismic data for obtaining better images.

SUMMARY

According to one embodiment, there is a marine streamer spread for acquiring seismic data, the spread including a streamer having a first portion and a second portion; the first portion including both first pressure sensors and pressure derivative sensors for acquiring the seismic data; and the second portion including second pressure sensors. The first portion imparts ghost diversity to the seismic data by having a variable-depth profile and the pressure derivative sensors impart polarity diversity to the seismic data.

According to another embodiment, there is a method for processing input seismic data d, the method including receiving the input seismic data d recorded in a first domain by seismic sensors that travel in water, the input seismic data d including up-going and down-going wave-fields; generating a model p in a second domain to describe the input seismic data d; and processing with a processor the model p to obtain an output seismic dataset indicative of a surveyed subsurface. The input seismic data d has ghost and polarity diversity.

According to another embodiment, there is a non-transitory computer readable medium including computer executable instructions, wherein the instructions, when executed by a processor, implement instructions for processing input seismic data d as discussed in the above paragraph.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 6A-C illustrate the energy corresponding to signals recorded with pressure and pressure derivative sensors in far field;

FIGS. 7A-C illustrate the energy corresponding to signals recorded with pressure and pressure derivative sensors in near field;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a curved streamer towed in water by a vessel. However, the embodiments to be discussed next are not limited to a curved marine streamer; they may be applied to other seismic receiver configurations, e.g., an ocean bottom system such as ocean bottom cable or seabed nodes.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a marine towed seismic spread configured to simultaneously acquire pressure wave-fields and their derivatives with ghost diversity through a variable streamer depth configuration. A processing method to be discussed later takes advantage of the combination of (1) ghost diversity for pressure and its derivative and/or (2) polarization diversity, where dephasing of notch locations allows a boost to the mid- and high-frequency content of obtained broadband seismic data. Simultaneous acquisition of pressure and its derivative with sensors located at the curved part of the variable-depth streamer is sufficient to provide high-quality pre-stack broadband data. Moreover, a processing method based on 5-dimensional (5D) regularization (e.g., based on Xr and Yr positions of the receivers, Xs and Ys positions of the source, and time, the recorded seismic data may be reconstructed at different positions), with the use of simultaneous acquisition of pressure and its derivatives, provides densely spatially sampled pre-stack wave-fields.

Figure 1:
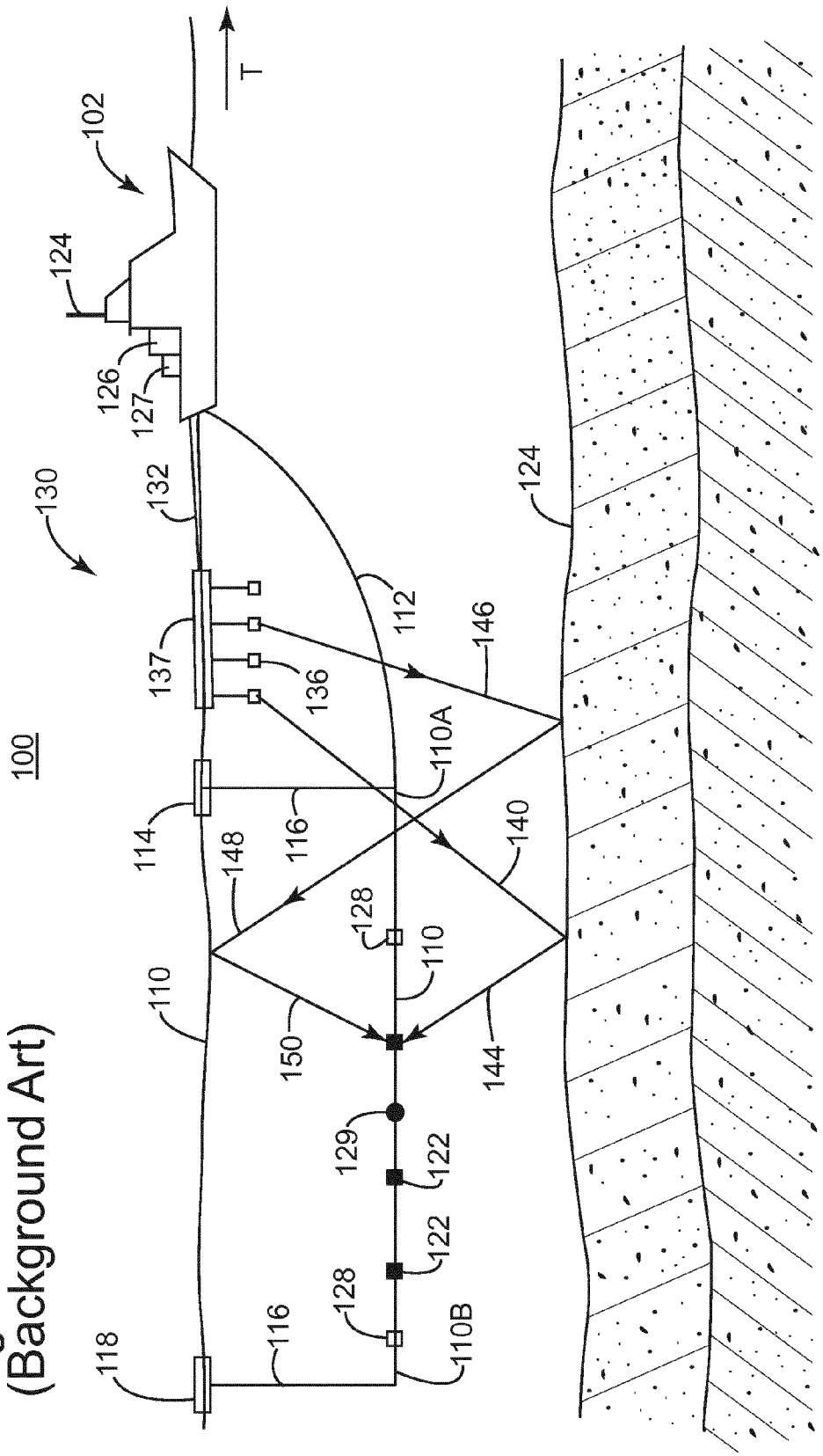
FIG. 1 is a schematic diagram of a seismic acquisition system.

As discussed with regard to FIG. 1, the primary (up-going wave) may be masked by the ghost (down-going wave). This happens due to the interference of up-going and down-going wave-fields, which masks the frequency bandwidth with notches located at some particular frequencies. These particular frequencies are related to the depth of the sensor and to the polarities of both signals: primaries and ghosts. The two factors that may affect the signals' polarities are (i) the reflection coefficient of the water surface and (ii) the direction of propagation.

Figure 2:
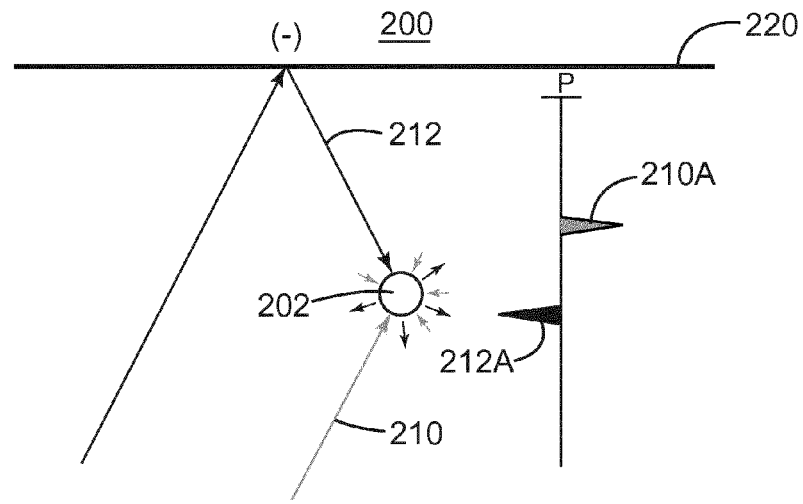
FIG. 2 illustrates polarities for primary and ghost recorded with a pressure sensor.

With regard to FIG. 2, for the case of sensors recording the pressure wave-field P (e.g., a hydrophone), the wave's direction of propagation does not affect the recorded wave-field's polarity. More specifically, FIG. 2 shows an arrangement 200 that includes a pressure sensor 202. Pressure sensor 202 records primary wave-field 210 and also ghost wave-field 212, which is time-delayed relative to primary wave-field 210. Because the polarity 212A of ghost 212 is opposite to the polarity 210A of primary 210 due to the reflection of ghost 212 at water surface 220, the pressure sensor does record the polarity change. The change in polarity can be identified in a trace (recording of seismic signal over time). This change in polarity is due to the first factor, i.e., the reflection coefficient of water surface 220. In other words, the second factor, i.e., the direction of propagation of the wave, does not play a role when using a pressure sensor.

Figure 3:
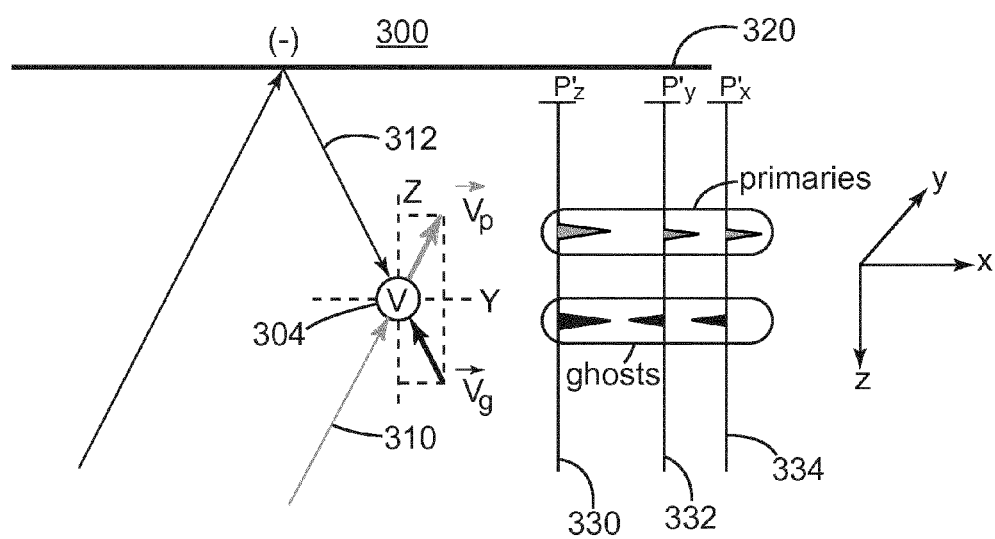
FIG. 3 illustrates polarities for primary and ghost recorded with a pressure derivative sensor.

However, the situation is different if a pressure derivative sensor 304 is used as illustrated in FIG. 3. For this case, the wave that propagates downward has a negative polarity (i.e., its polarity is multiplied by −1), while the wave that propagates upward does not have a polarity change (i.e., its polarity is multiplied by +1). To exemplify this supplemental change in polarity, FIG. 3 shows a configuration 300 in which a pressure derivative sensor 304 is configured to determine the pressure derivative along one or more directions. In this case, for illustrative purposes, pressure derivative sensor 304 is considered to be capable of determining the pressure derivative along three axes, X, Y and Z. The polarity of each change in pressure (P') is illustrated on a corresponding axis 330, 332 and 334. On axis 330, which corresponds to direction Z, the primary 310 and ghost 312 (reflected from water surface 320) have the same polarity. This is so because ghost 312 changes polarity when reflected at water surface 320 and then changes again its polarity because its incident direction at sensor 304 is opposite to the primary's incident direction. For the cross-line direction (axis Y, usually perpendicular to the streamers holding the sensors), the polarities for primary and ghost are indicated on axis 332 and they are opposite, contrary to the polarities on axis 330 discussed above. This is so because on the Y axis, both primary and ghost have the same direction and thus, only the first factor (i.e., water surface reflectivity) affects their polarity. The same is true for axis 334, i.e., the inline direction of the streamer.

Thus, if a sensor recording the vertical derivative of the pressure is located in the vicinity of the pressure sensor, the polarity of a down-going wave-field (ghost) is being affected by the direction of propagation and is opposite to the polarity of a down-going wave-field (ghost) recorded by the pressure sensor as illustrated in FIG. 2.

Figure 4:
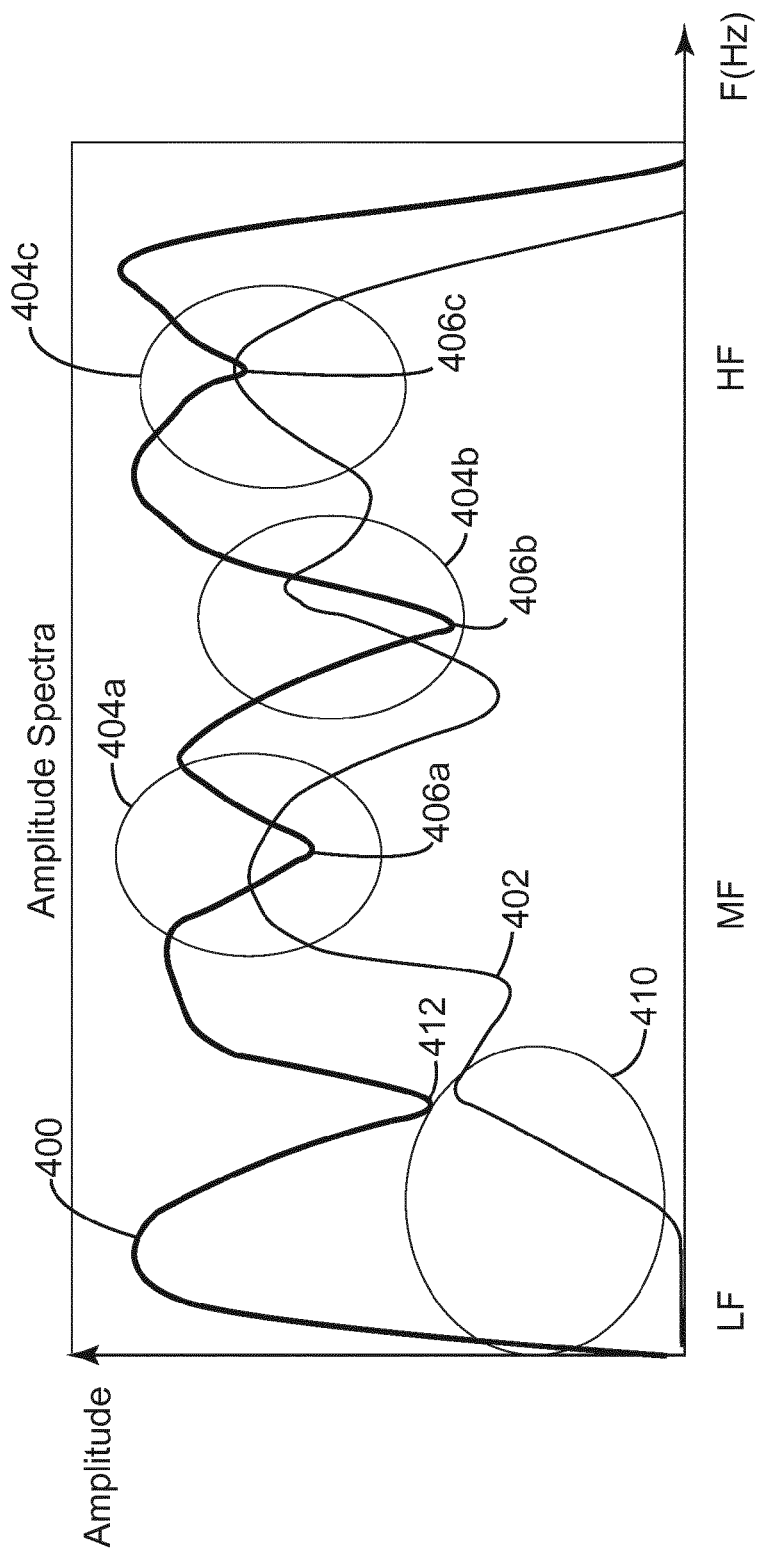
FIG. 4 illustrates the amplitude spectra of seismic data recorded with pressure and pressure derivative sensors.

The polarity diversity illustrated in FIGS. 2 and 3 constitutes a new way for further deghosting recorded seismic data. In this regard, the amplitude spectra of both recorded wave-fields, i.e., pressure and vertical derivative of the pressure (note that the process to be discussed herein may use not only the vertical derivative of pressure, but the derivative of pressure along the inline, cross-line or any other direction), are complementary as illustrated in FIG. 4, which shows the pressure amplitude spectrum 400 and the pressure derivative amplitude spectrum 402 having various zones 404a-c, in the mid- to high-frequency range, for which the notch 406a-c of pressure spectrum 400 can be filled by the energy of pressure derivative amplitude spectrum 402 (called fill-in characteristic). The fill-in characteristic of the spectra can be successfully used to recover the bandwidth of the signal harmed by the interference of up-going with down-going wave-fields in the mid- and high-frequency range. However, as indicated by zone 410, the low-frequency energy recorded by the vertical differential pressure sensor is weak and close to the noise floor, and it cannot be used to fill in notch 412 in the pressure amplitude spectrum 400 at the low-frequency range.

Figure 5B:
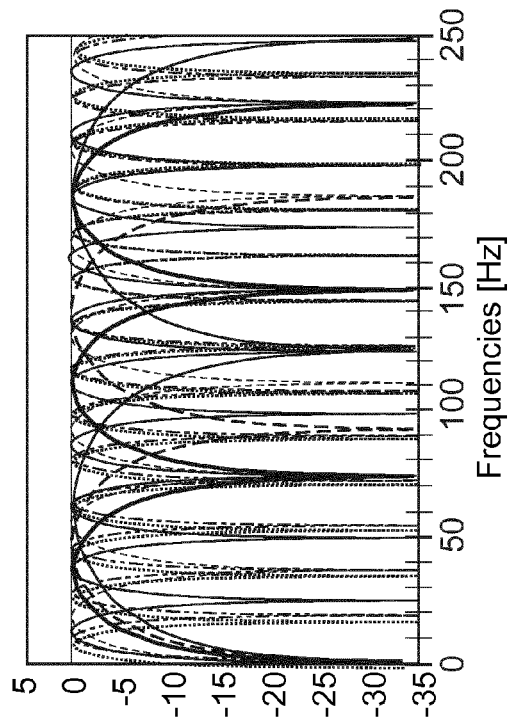
FIG. 5A illustrates a variable-depth streamer and FIG. 5B illustrates the spectra for waves recorded with the variable-depth streamer.
Figure 5A:
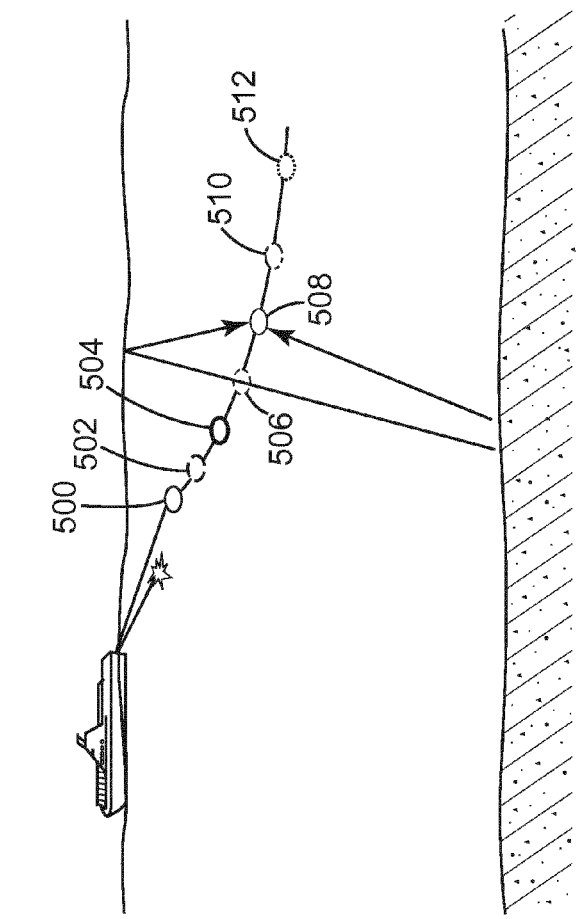

In one embodiment, the sensors are aligned along a streamer deployed with a variable depth. Regardless of the type of sensors, the delays of the ghosts along the curved portion of the streamer are no longer constant due to the variable-depth profile. The ghost diversity complements the polarity diversity and enables recording energy at each frequency range, as illustrated in FIGS. 5A-B, which show energy spectra 500 to 512 corresponding to depths of 6, 8, 10, 20, 30, 40 and 50 m, respectively. Because the streamer embeds a dense number of pressure sensors, the ghost diversity is not limited to the example of depths pictured in FIG. 5A and related frequencies pictured in FIG. 5B, but will cover all the frequencies range.

In a same manner, the streamer embeds a dense number of derivative pressure sensors especially on the near-offset portion of the streamer cable that bring polarity diversity. The fill-in effect procured by these sensors applies to the corresponding part of the mid- and high-frequency spectrum. The fill-in characteristic is inherited from any location at the surface, e.g., common midpoint, common image point, bin, etc.

In one application, the sensors located at the deeper part of the streamer acquire high-quality, low-frequency seismic signals. This acquisition technique combined with a corresponding processing algorithm (to be discussed later) produces broadband images with strong low-frequency content.

Acquiring seismic data simultaneously with pressure sensors and pressure derivative sensors, distributed along a variable-depth portion of a streamer, allows obtaining seismic data with ghost diversity and polarity diversity. The polarity diversity offers another way of deghosting the seismic data.

One of the benefits of simultaneous data acquisition is boosting the mid- and high-frequency energy of seismic signals obtained after the application of a specific processing method. Note that the term "simultaneous" data acquisition refers to measuring the pressure and pressure derivative at substantially the same time during the acquisition campaign. This means that the pressure and pressure derivative data is acquired within a time interval of less than 10 ms. In one application, the time interval is about 1 ms or 2 ms or 4 ms.

In one embodiment, the quality of the high-frequency part of the spectrum may be maintained by using the pressure/pressure derivative sensor combination even when ghost diversity at the high-frequency part is reduced. Knowing that shallower sensors provide the necessary ghost diversity to fill in the high-frequency part of the spectra, the use of multi-sensors as discussed above allows towing the front end of the seismic spread deeper, compared to a traditional case for which there is no polarity diversity. Thus, adverse weather conditions have less impact on data acquired by a variable-depth spread with multi-component sensor streamers. Therefore, if one or more of the above-discussed embodiments are implemented, it is possible to improve the operational efficiency of broadband acquisitions.

As noted above, it is possible to record not only the vertical pressure derivative, but also the horizontal (inline and/or cross-line) pressure derivative. The recorded horizontal pressure derivative contains valuable information about the 3D direction of propagation of the seismic waves. This direction of propagation depends on two factors: source-receiver direction and complexity of subsurface. In the case of one-vessel acquisition, the variation of source-receiver azimuths is narrow, except at the near offsets (i.e., sensors closest to the vessel). In this respect, FIGS. 6A-C show a simulated 3D shot gather for a far offset (i.e., far away from the source, for example, about 8 km away with FIG. 6A showing the energy of the pressure field and FIGS. 6B-C showing the energy of lateral derivatives of the pressure field along the streamer ($P'_{inline}$ and perpendicular to the streamer ($P'_{crossline}$). Each figure shows the energy plotted in time (vertical axis) and relative to the source (offset on the horizontal axis). Similarly, FIGS. 7A-C are shown for a simulated 3D shot gather for near offset, i.e., offset of about 100 m from the source.

When comparing the two sets of figures, it is noticeable that far offset energy for the cross-line component is weak (FIG. 6C), which makes it unusable, while near offset energy for the cross-line component (FIG. 7C) is strong enough for processing. Thus, the probability of acquiring valuable cross-line pressure derivative energy at long offsets is low, and for this reason, it is possible to omit pressure derivative sensors at the far offset (i.e., toward the distal end of the streamer) without harming the quality of broadband images. In one embodiment, it is at near offset, i.e., along the bent part of a variable-depth streamer, where the de-phased ghost diversity of pressure and its derivatives is more beneficial for boosting the mid- and high-frequency range of the seismic energy. Thus, the utility of sensors deployed at the deeper part of the streamer (at large offsets) is primarily related the low-frequency content of the bandwidth, where pressure derivative sensors do not excel.

Figure 8:
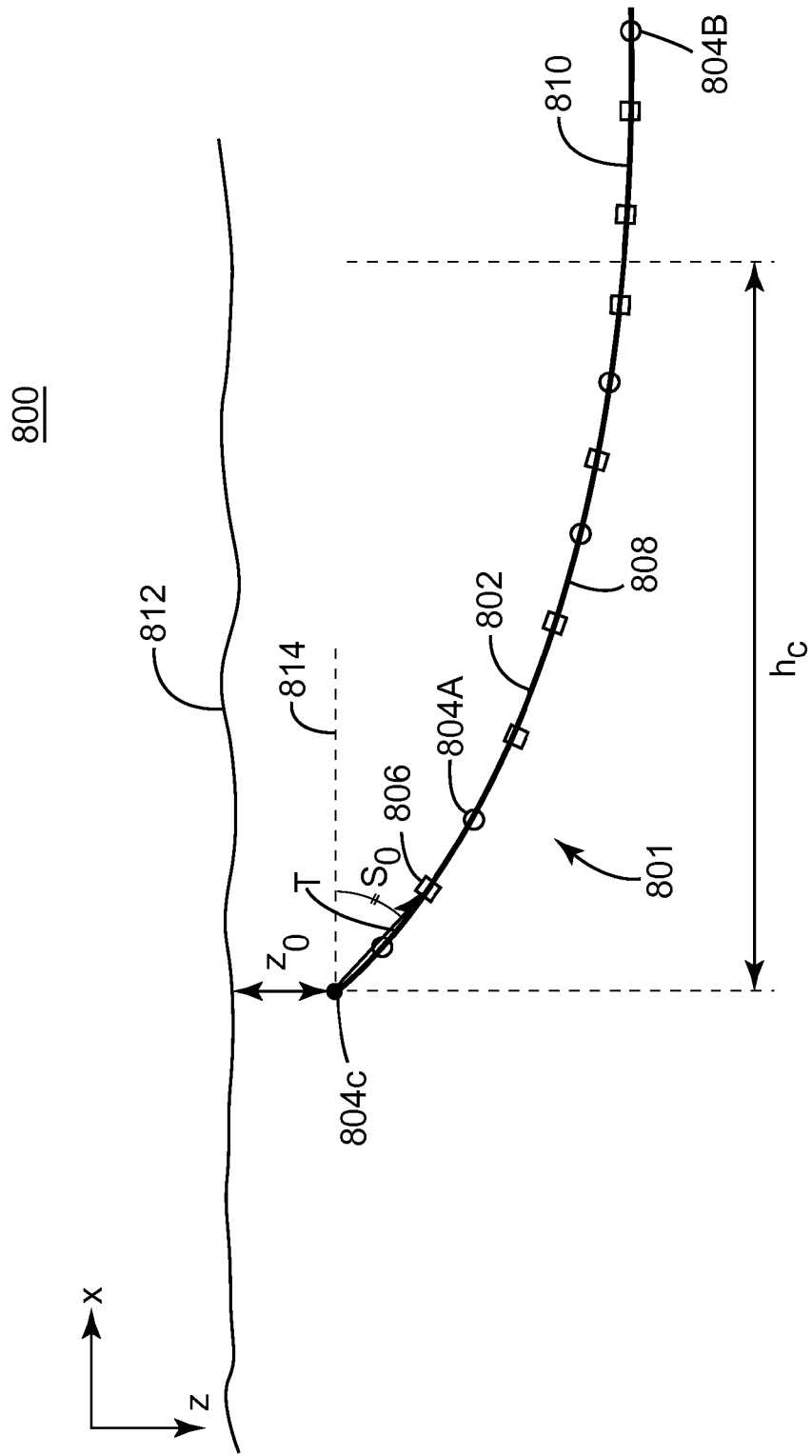
FIG. 8 is a schematic diagram of a streamer spread having a variable-depth streamer.

For this reason, in one embodiment illustrated in FIG. 8, a streamer spread 800 includes at least a streamer 801 having a variable-depth profile (e.g., curved profile or slanted profile) and includes a body 802 having a predetermined length, plural detectors 804A distributed along the body, and plural birds 806 located along the body for maintaining the selected curved profile. The streamer is configured to flow underwater when towed such that the plural detectors are distributed along the curved profile. The curved profile may be described by a parameterized curve, e.g., a curve described by (i) a depth $z_0$ of a first detector 804C (measured from the water surface 812), (ii) a slope $s_0$ of a first portion T of the body with an axis 814 substantially parallel to water surface 812, and (iii) a predetermined horizontal distance $h_c$ between first detector 804C and an end of the curved profile. Note that not the entire streamer has to have the curved profile. In other words, the curved profile should not be construed to always apply to the entire length of the streamer. While this situation is possible, the curved profile may be applied only to a portion 808 of the streamer. In other words, the streamer may have (i) only a portion 808 having the curved profile or (ii) a first portion 808 having the curved profile and a second portion 810 having a different profile, with the two portions being attached to each other.

According to an embodiment, sensors 804A distributed along the first portion 808 are different from sensors 804B distributed along a second portion 810. For example, sensors 804A may include both pressure and pressure derivative sensors, while sensors 804B may include only pressure sensors. In one embodiment, the first portion 808 (which may be curved or slanted) has a first part that includes both pressure and pressure derivative sensors and a second part that includes only pressure sensors. The pressure derivative sensors may include sensors configured to directly measure the pressure derivative along a given direction. In one application, the pressure derivative sensor may be an accelerometer or equivalent sensor that determines a displacement, velocity or acceleration of a particle, and logic associated with the sensor calculates the pressure derivative based on the measured displacement, velocity or acceleration. A combination of these sensors may be used for the pressure derivative sensor.

Figure 9A:
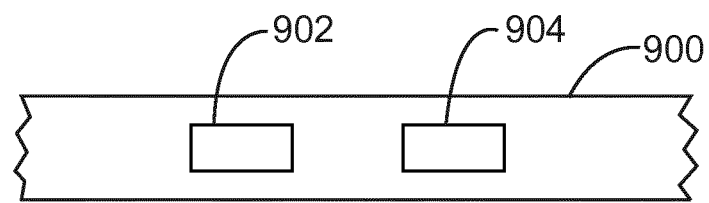
FIGS. 9A-B illustrate pressure and pressure derivative sensors distributed inside a streamer.
Figure 9B:
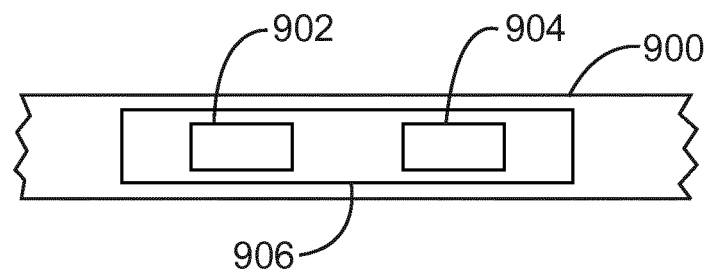

In one application, as illustrated in FIG. 9A, a pressure sensor 902 and a pressure derivative sensor 904 are placed next to each other (e.g., co-located) inside streamer 900. In another application illustrated in FIG. 9B, both pressure sensor 902 and pressure derivative sensor 904 are placed in a same enclosure (or holder) 906 inside streamer 900. Pressure derivative sensor 904 may measure a single component (e.g., vertical pressure derivative) or multiple components (e.g., overall pressure derivative), i.e., the pressure derivative sensor may have single component or multiple component output.

Returning to FIG. 8, an optimal and efficient way to simultaneously acquire pressure and its derivatives with the goal of obtaining broadband seismic data and densely regularized prestack wave-fields (the prestack precedes the stack phase in which the wave-fields are added together and this method may be performed with the prestack wave-fields) is to set up an acquisition spread with variable-depth deployment where sensors 804A recording pressure derivative are substantially located at the near offsets and sensors 804B recording only the pressure are located at the far offsets. This system allows the simultaneous acquisition of pressure and its derivative (polarity diversity) with ghost diversity.

A 5D regularization process allows for regularizing the recorded seismic data affected by source-receiver mis-positioning and, under some conditions, to generate an even denser data grid. One of these conditions is the knowledge of the derivatives of the pressure field. Acquiring simultaneously the pressure and its derivatives with ghost diversity allows for building a processing method able to generate very dense 5D data as now discussed. The use of pressure derivatives in the regularization method is relevant for mid- and high-frequencies and near offset seismic data. The regularization of low-frequency and long offset parts of seismic data benefits from the larger size of vibrating area responsible for the reflected energy, the so-called Fresnel zone.

A method for deghosting seismic data acquired with a variable-depth streamer profile is discussed in the '951 patent. Thus, this method is not further discussed herein. Another method for deghosting seismic data acquired with a variable-depth streamer profile is disclosed by U.S. patent application Ser. No. 13/334,776 (herein '776) authored by G. Poole, the entire content of which is incorporated herein by reference. This method uses a surface datum tau-p model that represents input shot data. A transform from the tau-p model to a shot domain (offset-time) combines the operations of redatuming and reghosting. The use of variable-depth streamer data combined with reghosting ensures that a single point in the tau-p domain satisfies a range of different ghost lags, therefore, making use of variable-depth data notch diversity, which ensures effective receiver deghosting.

More specifically, application '776 uses a least square formulation given by:

$$d = Lp \tag{1}$$

or, in the expanded matrix form, $$\begin{pmatrix} d_1 \\ d_2 \\ d_N \end{pmatrix} = \left( e^{-2\pi i f \tau_{pr}} - e^{-2\pi i f \tau_{gh}} \right) \begin{pmatrix} p_1 \\ p_2 \\ p_3 \\ p_M \end{pmatrix}, \tag{2}$$

where column vector d contains a frequency slice from the shot domain data (known), column vector p contains the surface datum tau-p model (unknown), and matrix L makes the transform (known) from the surface tau-p model to the input shot data. Matrix L may combine the operations of redatuming and reghosting.

The time shifts for primary (up-going) and ghost (down-going) wave fields are given by:

$$\tau_{pr} = (h_n + \Delta h)s_m - \Delta\tau \tag{3}$$

$$\tau_{gh} = (h_n - \Delta h)s_m + \Delta\tau, \tag{4}$$

where $h_n$ is the offset of a given trace in column vector d, $s_m$ is the slowness of a given trace in the surface tau-p model, $\Delta h$ is the offset perturbation as described in the '776 application, and $\Delta\tau$ is the temporal perturbation as also described in the '776 application. Equation (1) can be solved in the time or spectral (e.g., frequency) domain using linear inversion. The method can be applied on the whole shot (cable-by-cable) or in spatial windows of a user-defined number of channels.

However, existing methods do not take into account the polarity diversity discussed in some of the above embodiments. Equation (2) may be modified, when pressure derivative data is available, so that the transfer function or operator L can be extended. For example, tau-p model "p" may simultaneously satisfy pressure and vertical pressure derivative data "d" i.e., $$\begin{pmatrix} h_1 \\ h_2 \\ h_{N_h} \\ P'_{Z_1} \\ P'_{Z_2} \\ P'_{Z_{N_p}} \end{pmatrix} = \begin{pmatrix} e^{-2\pi i f \tau_u} - e^{-2\pi i f \tau_d} \\ FF(e^{-2\pi i f \tau_u} + e^{-2\pi i f \tau_d}) \end{pmatrix} \begin{pmatrix} p_1 \\ p_2 \\ p_3 \\ p_M \end{pmatrix}, \tag{5}$$

where $\tau_u$ is the time shift for the up-going wave and $\tau_d$ is the time shift for the down-going wave. The time shifts may be defined similar to those of equations (3) and (4) or in a different manner, depending on the model used to describe the wave propagation. The top of the L matrix and the top of data vector d relate to the $N_h$ hydrophone measurements, and the bottom of matrix L and the bottom of data vector d relate to $N_p$ pressure derivative measurements. The term FF in matrix L represents a frequency filter relating to the usable bandwidth of the pressure derivative data. This would normally relate to a low cut filter, which may be a butterworth or other low cut filter. The value of FF is a scalar which will vary with frequency.

Note that while seismic data d is recorded in a first domain, processing of the data may take place in a second domain, different from the first domain. The first domain may be a time-space domain and the second domain may be one of a radon domain, frequency-wave number domain, tau-p domain, parabolic domain, shifted hyperbola domain, singular value decomposition, rank reduction and curvelet domain. After obtaining model p, it is possible to design and apply an L' transform to obtain the output seismic dataset. The L' transform may be different from the L transform. In one embodiment, the L' transform is obtained either by suppressing the ghost terms in the L transform to obtain the primaries, or by suppressing the primary terms in the L transform to obtain the ghosts. Other functions may be used for the L' transform for obtaining redatuming, noise reduction, etc.

Using model p of equation (5) leads to several options for the 2-D case, a selection of which is given below:
1) Output up-going (primary) data at the streamer datum. The up-going may be subsequently subtracted from original pressure data to leave down-going (ghost) energy only.
2) Output down-going data at the streamer datum. The down-going may be subsequently subtracted from original pressure data to leave up-going energy only.
3) Output up-going or down-going data at sea surface datum.
4) Output up-going or down-going data at a new horizontal datum. This allows wave-field separated data to be provided at the start of the processing sequence so that the data can be processed with conventional algorithms.
5) Output up-going or down-going data at a new variable-depth datum.
6) Output up-going and down-going data at a new datum. For example, this can be useful for time-lapse studies. Note that a time-lapse study, also called 4D, includes at least two 3D seismic surveys of a same subsurface, taken at different times, for observing changes in the surveyed subsurface.
7) It is also possible to apply deghosting and redatuming in two independent steps. First deghost the data (leaving it at the original depths), then redatum it as a separate operation.

Instead of outputting up-going and down-going wave-fields, it is possible to output particle motion data at any x-z location with any orientation. This allows the output of particle motion data on or between the streamers that is substantially free of down-going (ghost) or up-going (primary) energy. The above options can be used to output data at the same offsets as input data, or at new offsets. These are only a set of options, and those skilled in the art could easily imagine other options based on the above-discussed concepts.

According to still another embodiment, it is possible to derive a single fixed datum model which, when reverse-transformed, simultaneously models all available pressure derivative and pressure measurements at the recording depths and offset-x/offset-y positions.

Once the tau-px-py model has been found (no matter which formulation or which components have been used), it can be used to output up-going data, down-going data, or a combination of the two at any spatial position, where the term "spatial position" means x (inline position), y (cross-line position), and z (receiver depth) coordinates. Note that the term "output" includes one or more of wave-field regularization, interpolation, deghosting, denoising, redatuming, resampling, etc. Each individual output trace can have its own x, y, z location (e.g., general floating datum). This location may be at the position of the original receivers, in between the original receivers, for example, interpolation at a new streamer location, at any receiver depth, or a combination of in between the streamers at different depths. This method can be used to output up-going energy at the surface or other horizontal datum, which may be subsequently processed with conventional processing algorithms. The method can also be used to output down-going energy at the surface or any other datum and, again, this may be processed with conventional algorithms.

The interpolation aspect of this method can be used to de-alias the cross-line sampling of a dataset, or to map on to the exact receiver x-y-z coordinates of another dataset, towed streamer, ocean bottom systems (OBS), or land dataset. The data may be output for up-going, down-going or a combination of the two. The output positions of all traces can be at any x-y-z coordinate within the original streamer spread or outside the spread (extrapolation). Up-going and down-going datasets may be output at different datums if required.

In another embodiment, the L matrix discussed above may be used for time-lapse studies where one or more vintage datasets consist of measurements at different spatial coordinates and/or receiver depths than new acquisition measurements. Once the model p has been found, it may be used to output data at the exact x-y coordinates and depths of any prior vintage (baseline) dataset or other positions. This allows accurate comparison of vintage datasets and reconstructed monitor datasets. Up-going, down-going or a combination of both may be used for this purpose. For example, a base hydrophone-only dataset will contain primary and ghost data, and interpolation or deghosting of this base dataset may not be possible. In this case, it can be of interest to output the monitor data (the later-in-time survey data) at the x-y-z recording coordinates of the baseline, including primary and ghost. With multiple datasets, it may be of interest to interpolate all vintages on to a common sampling that includes positions not occupied by any dataset. The positions could be designed so that the interpolation distance on average is minimum, i.e., the positions are selected as close as possible to the input data positions because the interpolation quality at positions farther away is expected to degrade.

According to another embodiment, different x/y offsets and depths may be used for up-going and down-going datasets, for example, to improve illumination or to match wave-field propagation to a vintage dataset or datasets.

The methods discussed in the previous embodiments can be generalized to a method that derives a fixed datum model to satisfy any number of pressure derivative data with any 3D orientation, along with a different number of pressure measurements. Pressure and pressure derivative measurements need not be co-located in space or depth.

The 3D algorithms noted above may be used for many things. Some examples are given below:
1) Output up-going (primary) data at the streamer datum. The primary may be subsequently subtracted from original pressure data to leave down-going energy only.
2) Output down-going (ghost) data at the streamer datum. The ghost may be subsequently subtracted from original pressure data to leave up-going energy only.
3) Output up-going or down-going data at surface datum.
4) Output up-going or down-going data at a new horizontal datum. This allows deghosted data to be provided at the start of the processing sequence, so that the data can be processed with conventional algorithms.

5) Output up-going or down-going data at a new variable-depth datum.
6) Output up-going and down-going data at a new datum. For example, this can be useful for time-lapse studies.
7) It is also possible to apply deghosting and redatuming in two independent steps. First deghost the data (leaving it at the original depths), then redatum it as a separate operation.
8) Instead of outputting up-going and down-going wave-fields, it is possible to output pressure derivative data at any x-y-z location with any orientation. This allows the output of pressure derivative data on or between the streamers that is substantially free of down-going (ghost) or up-going (primary) energy. The output pressure derivative data at or between the streamers may or may not be corrected for obliquity. This data may be processed in parallel with pressure data and combined post-migration with a joint deconvolution-type deghosting approach. Alternatively, it may be summed with pressure data to achieve wave-field separation.
9) In addition, particularly with the use of sparse inversion, this procedure can be used for joint interpolation, deghosting and denoising.
10) The tau-$p_x$-$p_y$ model can be used to separate cross-talk noise (with simultaneous shooting) or interference noise based on model parameter ranges.
   a. In simultaneous shooting, the wave-field from two sources is recorded;
   b. Where the sources are at different spatial positions, there may be a difference in the angle at which the wave-field approaches the receivers;
   c. When this is the case, the wave-fields may be denoised by muting the noise in the tau-px-py domain. If the separation is not perfect, the noise may be further separated based on the non-coherent nature of the data in a given domain, for example, the common p/shot domain;
   d. Subsequently, a reverse tau-px-py transform may be used to separate energy from the different sources in combination with any other items listed here, or to come back to the original coordinates.
11) It is possible to make use of the model domain p for demultiple purposes, after which data (any combination of the above) may be output on the input sampling or elsewhere, with or without free surface ghost. One example is the application of multiple attenuation using tau-px-py deconvolution in the model space. In the tau-px-py domain (model domain p), multiples may be identified based on velocity discrimination and/or periodicity. Multiples are periodic in model domain p. Thus, recorded data d may be transformed to the model, autocorrelation functions may be calculated for each trace, a lag is determined based on autocorrelations for, e.g., predictive deconvolution, the deconvolution is applied to select the multiples, and the multiples are then transformed back to the time-space model where they are removed from original data d. Normally, sampling restrictions mean that tau-p deconvolution is applied in 2D in either the shot or receiver domain (or both). The results may be sub-optimal due to the data exhibiting 3D wave field propagation in reality. The use of pressure derivative measurements to make a 3D (tau-$p_x$-$p_y$) model p can thus lead to improved demultiple.
12) Any combination of the above-noted embodiments or parts of them may also be envisioned by one skilled in the art.

The above options can be used to output data at the same offsets as input data, or at new offsets. These are only a set of options, and those skilled in the art could easily imagine other options based on the above-discussed concepts.

Figure 10:
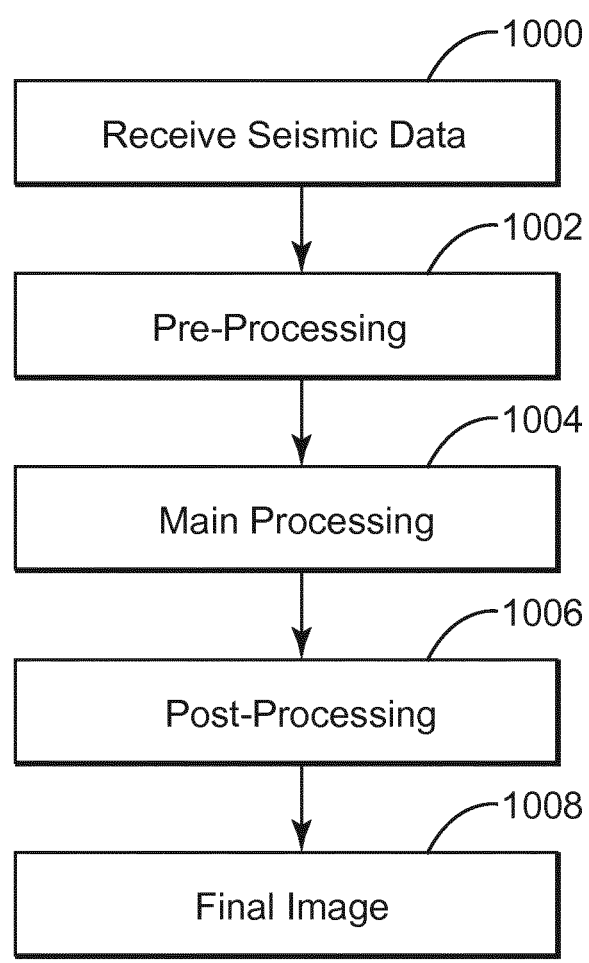
FIG. 10 is a flowchart of a method for processing seismic data.

Seismic data recorded with ghost diversity and polarity diversity as discussed above may be processed in a corresponding processing device for generating a final image of the surveyed subsurface as discussed now with regard to FIG. 10. For example, the seismic data generated with the spreads as discussed with regard to FIG. 8 may be received in step 1000 at the processing device. In step 1002, pre-processing methods are applied, e.g., demultiple, signature deconvolution, trace summing, motion correction, vibroseis correlation, resampling, etc. In step 1004, the main processing takes place, e.g., deconvolution, amplitude analysis, statics determination, common middle point gathering, velocity analysis, normal move-out correction, muting, trace equalization, stacking, noise rejection, amplitude equalization, etc. In step 1006, final or post-processing methods are applied, e.g. migration, wavelet processing, seismic attribute estimation, inversion, etc., and in step 1008 the final image of the subsurface is generated.

Figure 11:
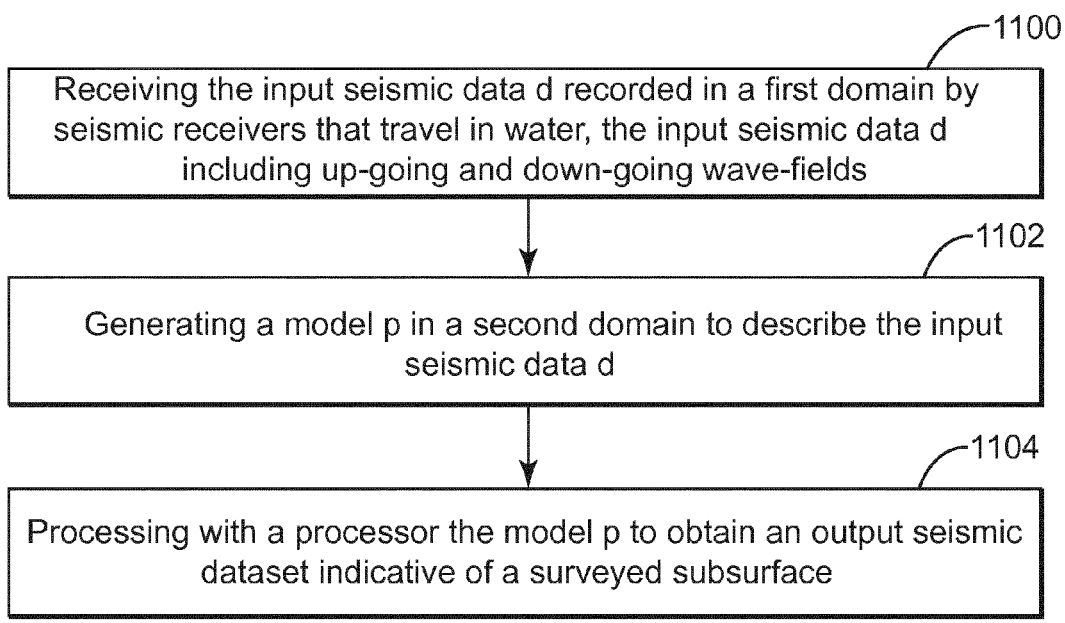
FIG. 11 is a flowchart of a method for generating an output seismic dataset based on seismic data having ghost and polarity diversity.

A more specific method for processing data is now discussed with regard to FIG. 11. The method for processing input seismic data d includes a step 1100 of receiving the input seismic data d recorded in a first domain by seismic receivers that travel in water, the input seismic data d including up-going and down-going wave-fields, a step 1102 of generating a model p in a second domain to describe the input seismic data d, and a step 1104 of processing with a processor the model p to obtain an output seismic dataset indicative of a surveyed subsurface. Input seismic data d has ghost and polarity diversity.

Figure 12:
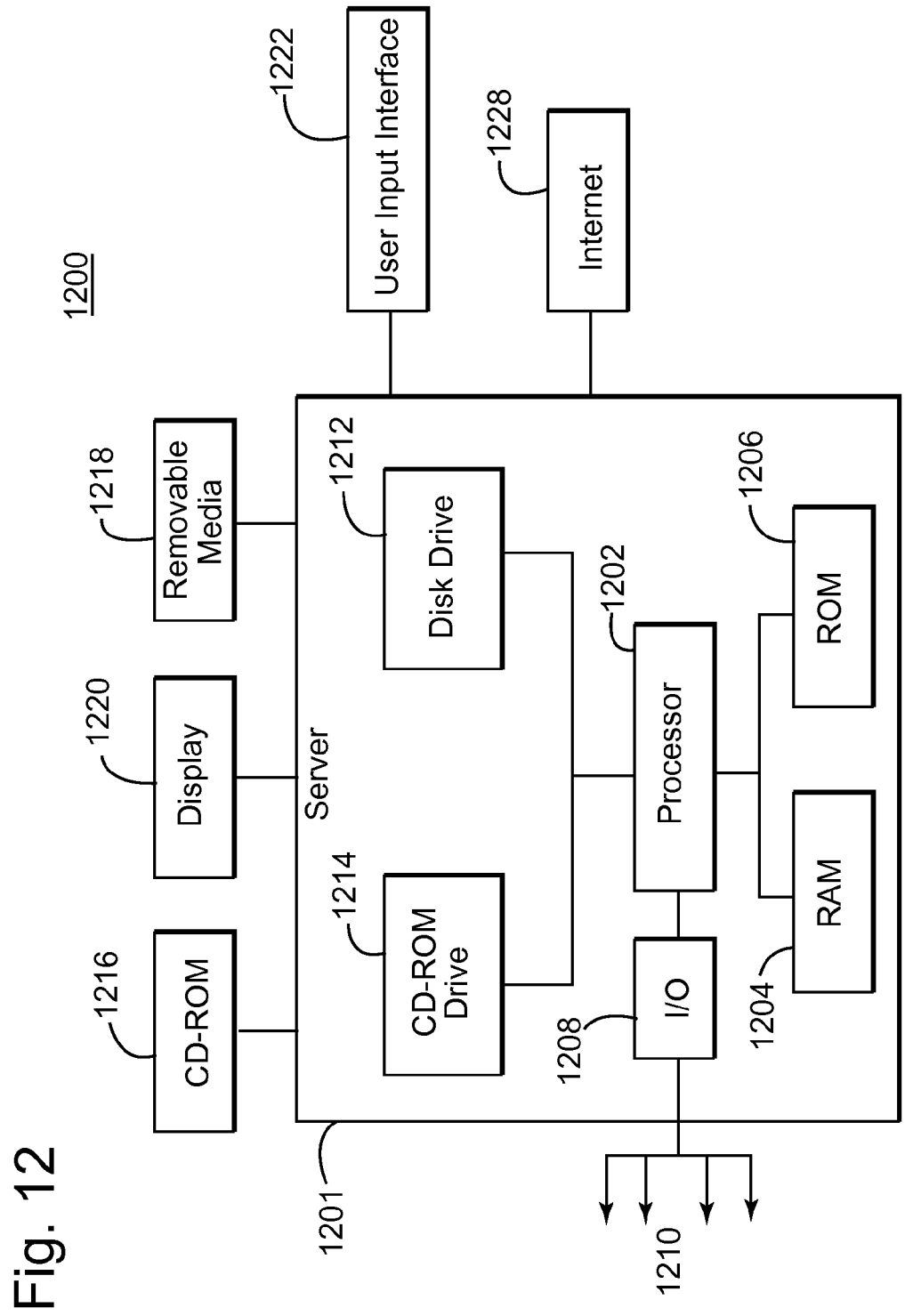
FIG. 12 is a schematic diagram of a control device.

An example of a representative processing device capable of carrying out operations in accordance with the embodiments discussed above is illustrated in FIG. 12. Hardware, firmware, software or a combination thereof may be used to perform the various steps and operations described herein. The processing device 1200 of FIG. 12 is an exemplary computing structure that may implement any of the processes and methods discussed above or combinations of them.

The exemplary processing device 1200 suitable for performing the activities described in the exemplary embodiments may include server 1201. Such a server 1201 may include a central processor unit (CPU) 1202 coupled to a random access memory (RAM) 1204 and/or to a read-only memory (ROM) 1206. The ROM 1206 may also be other types of storage media to store programs, such as programmable ROM (PROM), erasable PROM (EPROM), etc. Processor 1202 may communicate with other internal and external components through input/output (I/O) circuitry 1208 and bussing 1210 to provide control signals and the like. For example, processor 1202 may communicate with the source arrays and each streamer and/or receiver. Processor 1202 carries out a variety of functions as are known in the art, as dictated by software and/or firmware instructions.

Server 1201 may also include one or more data storage devices, including disk drives 1212, CD-ROM drives 1214, and other hardware capable of reading and/or storing information, such as a DVD, etc. In one embodiment, software for carrying out the above-discussed steps may be stored and distributed on a CD-ROM 1216, removable media 1218 or other form of media capable of storing information. The storage media may be inserted into, and read by, devices such as the CD-ROM drive 1214, disk drive 1212, etc. Server 1201 may be coupled to a display 1220, which may be any type of known display or presentation screen, such as LCD, plasma displays, cathode ray tubes (CRT), etc. A user input interface 1222 is provided, including one or more user interface mechanisms such as a mouse, keyboard, microphone, touch pad, touch screen, voice-recognition system, etc.

Server 1201 may be coupled to other computing devices, such as the equipment of a vessel, via a network. The server may be part of a larger network configuration as in a global area network (GAN) such as the Internet 1228, which allows ultimate connection to the various landline and/or mobile client/watcher devices. In one application, the Internet connection is achieved through a satellite link, for example, between the vessel performing the seismic suvey and a shore facility.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVD), optical storage devices or magnetic storage devices such a floppy disk or magnetic tape. Other non-limiting examples of computer-readable media include flash-type memories or other known types of memories.

The disclosed exemplary embodiments provide a streamer spread for acquiring seismic data having ghost and polarity diversity and a method for processing such data. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A marine streamer spread for acquiring seismic data, the spread comprising:
    a streamer having a first portion and a second portion;
    the first portion including both first pressure sensors and pressure derivative sensors for acquiring first pressure wave-fields and pressure derivatives wave-fields; and
    the second portion including only second pressure sensors for acquiring second pressure wave-fields,
    wherein the first portion is configured to have a variable-depth profile so that notches of a pressure amplitude spectrum of the acquired first and second pressure wave-fields are filled with energy from a pressure derivative amplitude spectrum of the acquired pressure derivatives wave-fields.

2. The streamer spread of claim 1, wherein the second portion has a flat or variable-depth profile and is free of pressure derivative sensors.

3. The streamer spread of claim 1, wherein the first pressure sensors and the pressure derivative sensors are co-located on the first portion, which is curved.

4. The streamer spread of claim 1, wherein the acquired first and second pressure wave-fields exhibit ghost diversity, which is associated with different times necessary for ghost wave-fields to reach corresponding first pressure sensors, distributed along the variable-depth profile, after their corresponding primary wave-fields have been recorded by the corresponding first pressure sensors.

5. The streamer spread of claim 1, wherein the acquired pressure derivatives wave-fields exibit polarity diversity, which is associated with an orientation of a measured pressure derivative wave-field relative to a given axis.

6. The streamer spread of claim 1, wherein a part of the seismic data associated with the first portion has both ghost diversity and polarity diversity while another part of the seismic data associated with the second portion has no diversity.

7. The streamer spread of claim 1, wherein a first part of the seismic data associated with the first portion has both ghost diversity and polarity diversity, a second part of the seismic data associated with the first portion has only ghost diversity and a third part of the seismic data associated with the second portion has neither diversity.

8. A method for processing input seismic data d, the method comprising:
    receiving the input seismic data d recorded in a first domain by seismic sensors that travel in water, the input seismic data d including up-going and down-going wave-fields;
    generating a model p in a second domain to describe the input seismic data d; and
    processing with a processor the model p to obtain an output seismic dataset indicative of a surveyed subsurface,
    wherein the input seismic data d includes (1) first pressure wave-fields acquired with first pressure sensors located on a first portion of a streamer, (2) pressure derivative wave-fields acquired with pressure derivative sensors located on the first portion of the streamer, and (3) second pressure wave-fields acquired with second pressure sensors located on a second portion of the streamer, and
    wherein the first portion is configured to have a variable-depth profile so that notches of a pressure amplitude spectrum of the first and second pressure wave-fields are filled with energy from a pressure derivative amplitude spectrum of the pressure derivatives wave-fields.

9. The method of claim 8, wherein the first pressure sensors and the pressure derivative sensors are co-located on the first portion.

10. The method of claim 8, wherein the second portion has a curved profile or a flat profile.

11. The method of claim 8, wherein the acquired first and second pressure wave-fields exhibit ghost diversity, which is associated with different times necessary for ghost wave-fields to reach corresponding first pressure sensors, distributed along the variable-depth profile, after their corresponding primary wave-fields have been recorded by the corresponding first pressure sensors.

12. The method of claim 8, wherein the acquired pressure derivatives wave-fields exibit polarity diversity, which is achieved with the pressure derivative sensors and the polarity diversity associated with an orientation of a measured pressure derivative wave-field relative to a given axis.

13. The method of claim 8, wherein the first domain is a time-space domain and the second domain is one of a radon domain, frequency-wave number domain, tau-p domain, parabolic domain, shifted hyperbola domain, singular value decomposition, rank reduction and curvelet domain.

14. The method of claim 8, wherein the input seismic data d includes a first seismic dataset acquired at a first time and a second seismic dataset acquired, over the same surveyed subsurface, at a second time.

15. The method of claim 8, wherein the step of processing includes a step of redatuming the output seismic dataset.

16. The method of claim 8, wherein the step of processing uses pre-stack wave-fields.

17. A non-transitory computer readable medium including computer executable instructions, wherein the instructions, when executed by a processor, implement instructions for processing input seismic data d, the instructions comprising:
  receiving the input seismic data d recorded in a first domain by seismic sensors that travel in water, the input seismic data d including up-going and down-going wave-fields;
  generating a model p in a second domain to describe the input seismic data d; and
  processing with a processor the model p to obtain an output seismic dataset indicative of a surveyed subsurface,
  wherein the input seismic data d includes (1) first pressure wave-fields acquired with first pressure sensors located on a first portion of a streamer, (2) pressure derivatives wave-fields acquired with pressure derivative sensors located on the first portion of the streamer, and (3) second pressure wave-fields acquired with second pressure sensors located on a second portion of the streamer, and
  wherein the first portion is configured to have a variable-depth profile so that notches of a pressure amplitude spectrum of the first and second pressure wave-fields are filled with energy from a pressure derivative amplitude spectrum of the pressure derivatives wave-fields.

* * * * *